Feb. 25, 1936.  B. C. RASH  2,032,026
LICENSE PLATE FOR AUTOMOBILES
Filed May 7, 1935
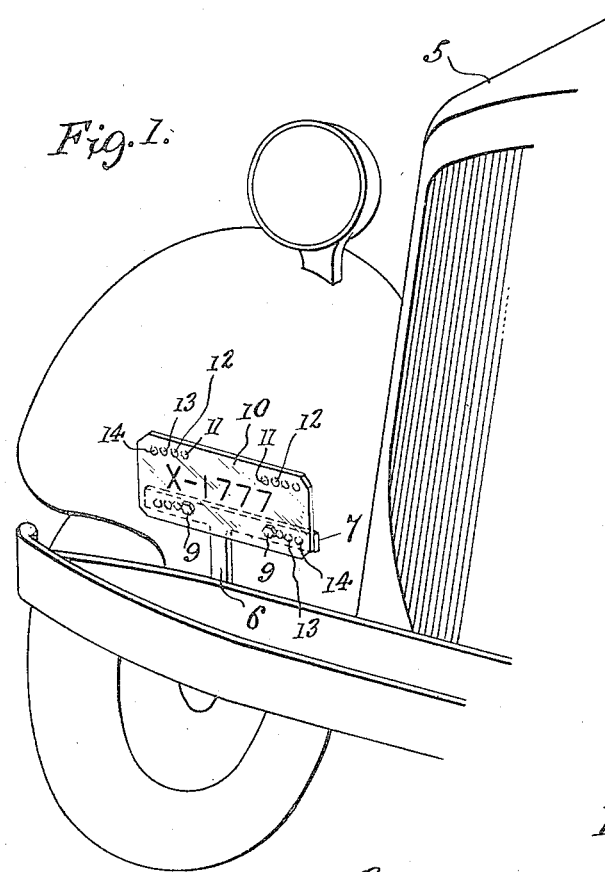
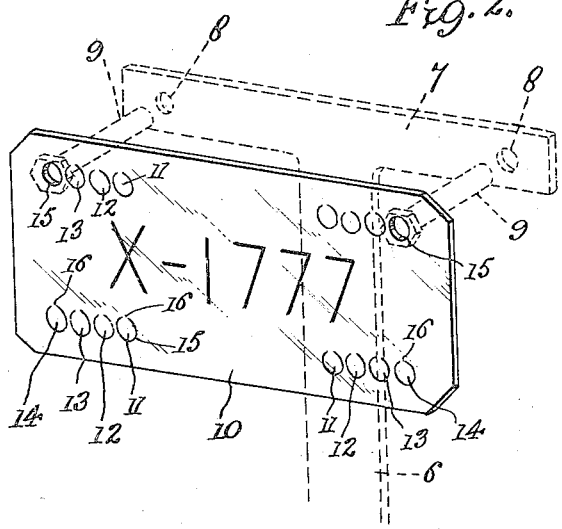
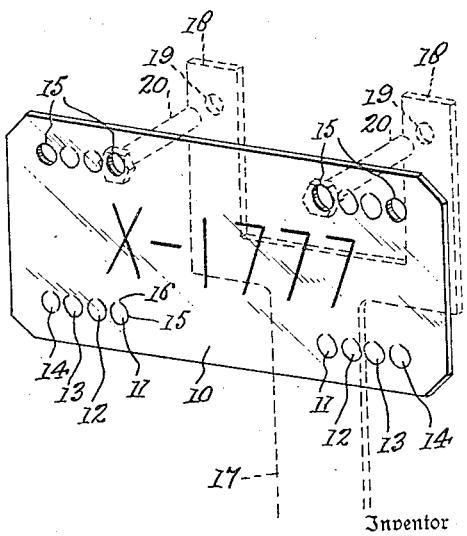
Inventor
B. C. Rash
By Mawhinney & Mawhinney
Attorneys.

Patented Feb. 25, 1936

2,032,026

UNITED STATES PATENT OFFICE 2,032,026

LICENSE PLATE FOR AUTOMOBILES

Ben C. Rash, Henderson, Ky.

Application May 7, 1935, Serial No. 20,239

4 Claims. (Cl. 40—125)

The present invention relates to improvements in license plates for automobiles and has for an object to provide an improved license plate in which the plate will initially assume the form of a blank with series of push-out portions adapted to be removed from the plate to afford openings for the passage of bolts employed to attach the license plate to the supporting bracket on the automobile.

Another object of the invention is to provide such a license plate with push-out portions which will act as a detector of stolen cars in case the license plate is interchanged from one car to another, where the bracket of the subsequent car requires that other portions be pushed out to line up with the supporting bolts; then in that case the original pushed-out parts will at all times stand out in evidence that the license plate was not that originally intended for that vehicle.

It is a further object of the invention to provide an improved license plate constructed with a series of push-out parts as above described but in which small portions are left uncut in such manner that by bending or flexing the filler-part, the latter will break off partially leaving a clean, round hole or other shaped hole through which bolts may be passed in attaching same to an automobile.

With the foregoing and other objects in view, the invention will be more fully described hereinafter and more particularly pointed out in the appended claims.

In the drawing in which like parts are denoted by like reference characters throughout the several views, Figure 1 is a fragmentary perspective view of an automobile showing one of the improved license plates attached thereto in one position of use.

Figure 2 is a perspective view of the improved license plate with a supporting bracket shown in dotted lines and illustrating a second method of application of the license plate to such bracket, and Figure 3 is a view similar to Figure 2 but illustrating in dotted lines a different form of bracket requiring different filler-parts to be pushed out and showing the device acting as a detector of stolen vehicles.

Referring more particularly to the drawing, in Figure 1 there is represented generally an automobile at 5 to which is attached the upright or standard part 6 of a license plate supporting bracket having the horizontal arm 7 extending to opposite sides of the standard 6.

As shown in Figure 2 the horizontal arm 7 is provided near its outer ends with openings 8 to receive the bolts or other fastenings 9 used for attaching the license plate 10 to the holder or bracket.

In accordance with the invention the license plate 10 is made with a series of partially cut-out portions. In the illustration shown there are four such portions provided in the corner parts of the plate 10. These plates are usually of metal and when manufacturing the same the push-out parts can be readily formed in the initial stamping operation. Four such push-out parts 11, 12, 13, and 14 are formed in each corner group although a greater or a less number may be provided. These push-out parts are also shown as stamped in circular formation but they may be stamped square or in any other configuration, the lines of definitive stamping being represented at 15 and there being in the same circumference and in line with these lines 15 uncut portions 16 left which are not stamped out.

These uncut portions 16 are small but they serve to retain a substantial attachment of the push-out portions or filler-parts 11, etc. to the body of the metal license plate 10; and such uncut portions enable the filler-parts 11 to be bent or flexed out of the plane of the license plate 10 whereby such uncut portions will break off in such a manner as to leave a clean, round hole (or other shaped hole) through which the bolts 9 may be made to pass in attaching the license plate to automobiles.

In the instance shown in Figure 1 the innermost push-out portions 11 of the two lower series of groups are shown to line up with the attaching bolts 9, the remaining filler-parts having been left in place so that the remainder of the license plate 10 retains its blank form.

In the instance shown in Figure 2, the bolts 9 register with the outermost filler-parts 14 and these filler-parts are pushed out to admit the bolts 9, the remaining filler-parts being left untouched in order that the entire body of the plate 10 may retain its form as a blank.

Referring more particularly to Figure 3, there is shown a different form of bracket such as used on a different make or type of automobile, such bracket consisting of a standard 17 and upright arms 18 relatively close to one another so that the openings or holes 19 therein register with the innermost filler-parts 11 in the license plate. The bolts 20 therefore pass through the holes or perforations made by the removal of these inner filler-parts 11.

If a license plate, originally issued for a type of car having the bracket as shown in Figure 2, is interchanged by thieves to a stolen car having a type of bracket shown in Figure 3, then there is no way for the thieves to restore the push-out parts 14 and the holes will remain in the tag notwithstanding the same are not occupied by the bolts 20 but that other filler-parts have had to be pushed out in order to accommodate these bolts 20 which are more closely spaced because of the bracket arms 18 than the bolts 9 of Figure 2. Wherever license plates are observed with unoccupied pushed out parts or holes therein this will be a tell-tale or signal to police officers and others that the license plate was not authoritatively issued for that vehicle and that the chances are the vehicle carrying such license plates has been stolen. License plates in this condition will act as a signal to officers warning the officers to detain the cars until the title thereto is shown to exist in the possessor.

It will be noted that the license plate may be affixed at either its upper or lower edges by reason of the provision of the groups of filler-parts at all four corners of the same. Figure 1 shows the license plate upstanding from the bracket while Figures 2 and 3 show the license plate attached at its upper edge and depending from the bracket arm.

It will be appreciated from the foregoing that the improved license plate provides an easy and quick arrangement for the attaching of the license plates to automobiles. Heretofore long slots were provided in the plates, while in the present case only one small hole is used serving the same purpose as the long slot and forming a better means of attachment and giving a better appearance to the plate on the vehicle.

It will be obvious that various changes may be made in the construction, combination and arrangement of parts which could be used without departing from the spirit of my invention and I do not mean to limit the invention to such details except as particularly pointed out in the claims.

Having thus described my invention, what I claim and desire to secure by Letters Patent of the United States is:—

1. A license plate comprising a body portion having a region carrying license indicia and spaced apart regions for receiving spaced fastener elements to secure the plate to a support and for disclosing the transfer of the plate from one car to another car having fastener means of different spacing, each region including a group of openings for such fasteners and push out means closing said openings and presenting exposed portions cooperating with the exposed portion of the rest of such region to present a substantially normal flat face.

2. The structure according to claim 1 wherein the fastener openings in each group are in alinement.

3. A license plate comprising a body portion having a region carrying license indicia and spaced apart regions for receiving spaced fastener elements to secure the plate to a support and for disclosing the transfer of the plate from one car to another car having fastener means of different spacing, each region including a plurality of inchoate fastener openings and push-out means closing said openings and presenting exposed portions cooperating with the exposed portion of the rest of such region to present a substantially normal flat face, each inchoate opening and its push-out closing means being simultaneously formed by partially cutting through the material of the plate along a line forming a substantially closed figure, whereby removal of the push-out means completes the formation of the opening.

4. A structure of the type defined in claim 3 in which the fastener openings of each region are arranged in alinement.

BEN C. RASH.